US00RE41763E

(19) United States
(12) Reissued Patent
Ng

(10) Patent Number: US RE41,763 E
(45) Date of Reissued Patent: Sep. 28, 2010

(54) MULTI-PLANE COMPOUND FOLDING FRAME

(75) Inventor: Kelvin Kin-Chung Ng, Trabuco Canyon, CA (US)

(73) Assignee: Oasis Concepts, Trabuco Canyon, CA (US)

(21) Appl. No.: 11/701,944

(22) Filed: Feb. 2, 2007

Related U.S. Patent Documents

Reissue of:
(64) Patent No.: 6,851,564
Issued: Feb. 8, 2005
Appl. No.: 10/447,612
Filed: May 28, 2003

(51) Int. Cl.
*A47F 5/00* (2006.01)

(52) U.S. Cl. ..... 211/149; 211/201; 108/171; 108/115

(58) Field of Classification Search ..... 211/149, 211/201, 132.1; 108/162, 166, 167, 168, 108/171, 172, 115–135
See application file for complete search history.

(56) References Cited

U.S. PATENT DOCUMENTS

| | | | | | |
|---|---|---|---|---|---|
| 1,198,431 | A | * | 9/1916 | Forsyth | 108/163 |
| 3,093,247 | A | * | 6/1963 | Erickson | 108/188 |
| 3,097,748 | A | * | 7/1963 | Drabert et al. | 108/171 |
| 3,138,122 | A | * | 6/1964 | Mondineau | 108/171 |
| 3,188,158 | A | * | 6/1965 | Sanchez | 312/277 |
| 3,437,058 | A | * | 4/1969 | Bue | 108/166 |
| 3,656,439 | A | * | 4/1972 | Domin | 108/175 |
| 4,522,130 | A | * | 6/1985 | Worthington | 108/159 |
| 4,740,010 | A | * | 4/1988 | Moskovitz | 280/641 |
| 5,131,547 | A | * | 7/1992 | Goldberg | 211/149 |
| 6,123,207 | A | * | 9/2000 | Mast | 211/149 |
| 6,443,481 | B1 | * | 9/2002 | Stravitz et al. | 280/651 |
| 6,685,199 | B2 | * | 2/2004 | Stravitz et al. | 280/42 |
| 6,848,371 | B2 | * | 2/2005 | Zheng | 108/165 |
| 6,928,934 | B2 | * | 8/2005 | Zheng | 108/127 |
| 2002/0158446 | A1 | | 10/2002 | Stravitz et al. | |

FOREIGN PATENT DOCUMENTS

| | | |
|---|---|---|
| DE | 200 12 511 U 1 | 2/2001 |
| EP | 1 208 777 A1 | 5/2002 |
| FR | 2 817 454 | 6/2002 |
| JP | S62-129927 | 8/1987 |
| JP | 2003-070547 | 3/2003 |

OTHER PUBLICATIONS

JPO Notification of Reason for Refusal dated Jul. 28, 2009 in JP patent application No. 2006–533476.
European search report for European patent application No. 04776149.9–2313—PCT/US2004016847 dated Jul. 18, 2006.
Canadian Office Action in re Application No. 2,519,099 dated Sep. 11, 2006.

* cited by examiner

*Primary Examiner*—Janet M. Wilkens
*Assistant Examiner*—Timothy M Ayres
(74) *Attorney, Agent, or Firm*—Kenneth H. Ohriner; Perkins Coie LLP

(57) ABSTRACT

A folding frame comprises four vertical legs and at least one shelf pivotally connected to each of the four vertical legs, each shelf being capable of folding vertically upward. The folding frame further comprises two support beams positioned beneath and on opposite ends of each shelf, each support beam being pivotally connected to two of the four vertical legs and capable of folding horizontally inward. The folding frame is moveable between an extended position with each shelf being horizontal and supported by two of the support beams, and a collapsed position with each shelf being folded vertically upward and the support beams being folded horizontally inward.

19 Claims, 8 Drawing Sheets

MULTI-PLANE COMPOUND FOLDING FRAME

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates in general to folding frames. More particularly, this invention relates to a folding frame that can be conveniently opened for use with four vertical legs and multiple shelves. The folding frame can be collapsed through a simple procedure to a compact format.

2. Description of the Related Art

Inexpensive foldable furniture has been quite popular for numerous years. Foldable furniture (or folding frames) are pieces of furniture that can be expanded for typical use and collapsed for storage or shipping. A few examples of folding frames include folding kitchen islands, serving carts, workbenches, drafting tables, craft tables, gardening carts, and storage shelves.

Although traditional folding frames can collapse to a certain extent, the folded profile of a traditional frame still tends to be bulky. Even in the collapsed format, traditional folding frames take up more room than necessary.

Instead of creating folding frames, some companies ship products in ready-to-assemble packages. This method allows furniture products to be shipped in a compact format, but requires assembly by the end user and does not allow for compact storage.

Thus, the need arises for a preassembled folding frame that can be stored and shipped in a compact format, and can be extended to a full-size piece of furniture such as a table or cart with multiple shelves. In addition, it is desirable that the procedure for transitioning between the collapsed position and the extended position be simple.

In U.S. Pat. No. 6,123,207, Mast discloses a shipping rack easily convertible to an extended mode for storing and shipping product, a display mode for displaying product, and a collapsed mode for storing the rack itself. The rack includes a pair of central support columns and a pair of outer posts on either side of the columns. A plurality of shelves is pivotally mounted between the posts and columns. In the extended mode, the shelves are horizontal. As the columns are raised with respect to the posts, the shelves pivot to the desired inclination. Once the shelves are essentially vertical and the posts are drawn close to the central columns, the rack is in the collapsed mode. The rack can be secured in any mode by a strut. A spring counterbalance system installed within one of the central columns assists the mode conversion of the rack.

Instead of supporting the shelves by using a central support column, the subject invention uses support beams running in a horizontal direction to support the shelves. As the folding frame is transitioned into a collapsed position, the support beams of the subject invention fold horizontally inward. Mast does not describe the use of inward folding support beams.

In U.S. Pat. No. 5,131,547, Goldberg discloses a collapsible storage rack assembly including a plurality of upstanding, generally inverted U-shaped frame members between which extend a plurality of vertically spaced, hingedly collapsible shelf assemblies. Using crossbeams for frame support and foldable movement, the storage rack can be easily and quickly opened for use by moving the frame members away from each other. In a similar manner, the storage rack can be easily collapsed by moving the frame members toward each other and into juxtaposition, with the shelf assemblies collapsing by upward hinging movement. In the closed and collapsed position, the shelf assemblies are substantially completely nested within the frame members, thereby facilitating convenient handling, shipment, and storage of the construction.

Instead of using cross-braces to allow for collapsing of the frame, the subject invention employs support beams that fold horizontally inward. The support beams of the subject invention also function to support the weight of the foldable shelves in the extended position. Goldberg does not describe the use of inward folding support beams to support the shelves.

SUMMARY OF THE INVENTION

Accordingly, one object of the present invention is to provide a folding frame that can be collapsed into a compact format.

A second object of the invention is to provide a folding frame that does not require assembly.

A third object of the invention is to provide a folding frame that extends into a full-size piece of furniture with multiple layers of shelves.

A fourth object of the invention is to provide a folding frame with a simple procedure for transitioning between the collapsed position and the extended position.

To achieve these and other advantages and in accordance with the purpose of the invention, as embodied and broadly described herein, the invention provides a folding frame comprising four vertical legs and at least one shelf pivotally connected to each of the four vertical legs, each shelf being capable of folding vertically upward. The folding frame further comprises two support beams positioned beneath and on opposite ends of each shelf, each support beam being pivotally connected to two of the four vertical legs and capable of folding horizontally inward. The folding frame is moveable between an extended position with each shelf being horizontal and supported by two of the support beams, and a collapsed position with each shelf being folded vertically upward and the support beams being folded horizontally inward.

DESCRIPTION OF THE PREFERRED EMBODIMENTS

Figure 1:
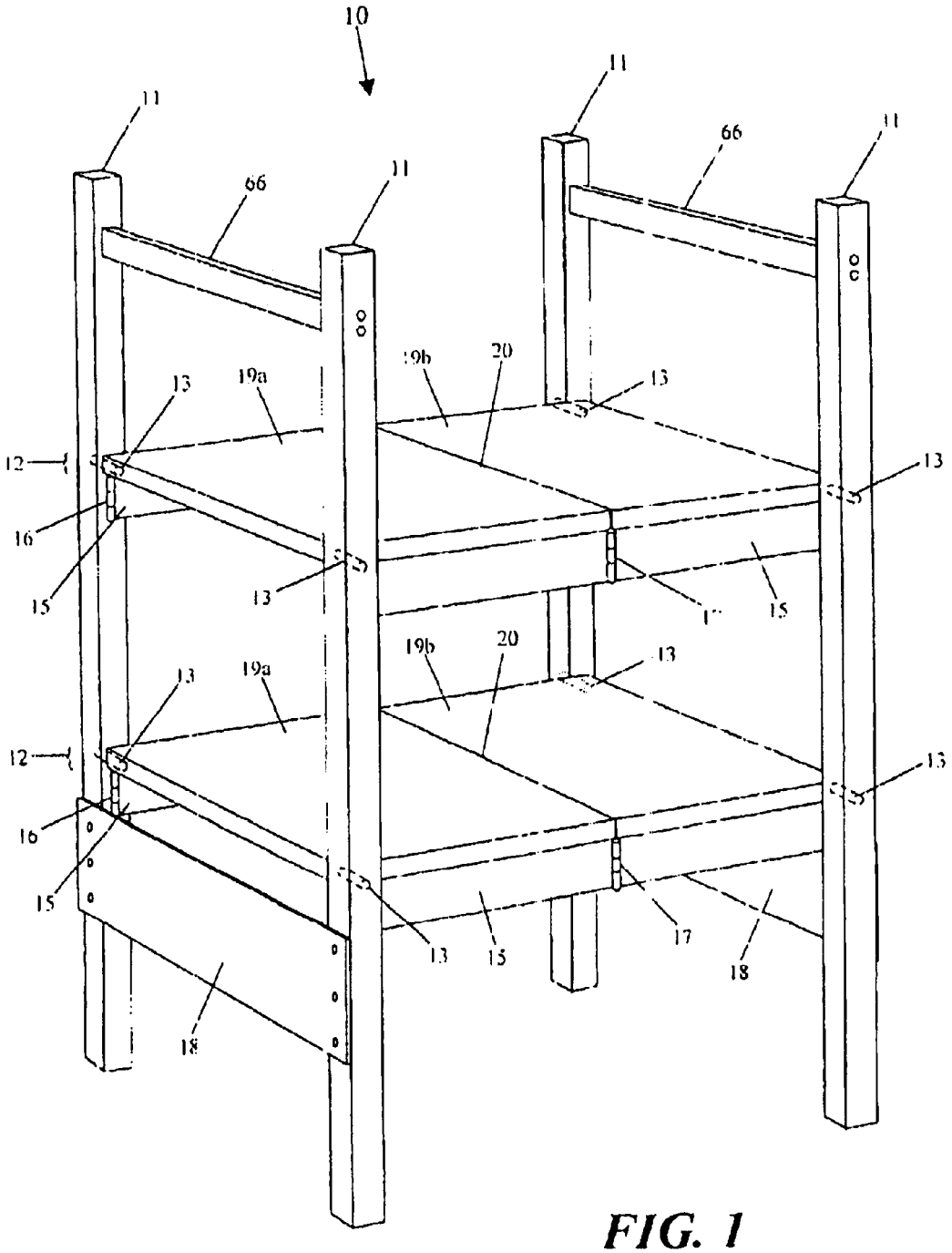
FIG. 1 is a perspective view of the folding frame of the present invention in the extended position.

Referring now to FIG. 1, a perspective view of the folding frame 10 of the present invention in the extended position is shown. In the extended position, folding frame 10 is a full-size piece of folding furniture. Folding frame 10 includes four vertical legs 11 supporting one or more shelves 12. Vertical legs 11 are connected horizontally by cross plates 18 and cross beams 66 for reinforcing stability of folding frame 10. In this embodiment, folding frame 10 has two shelves 12. It is preferred that shelves 12 are rectangular in shape. However, any shape allowing for shelves 12 to be connected to all four vertical legs 11 may be used. Each shelf 12 connects to the four vertical legs 11 via shelf studs 13. Shelf studs 13 allow for vertical movement of the shelf relative to folding frame 10. Although this embodiment uses shelf studs 13 to connect shelves 12 to vertical legs 11, any other means for pivotally connecting shelves 12 to vertical legs 11, such as bolts or hinges, may be used.

Still referring to FIG. 1, each shelf 12 is further supported by two support beams 15. Support beams 15 are positioned beneath and on opposite ends of shelves 12. Each support beam 15 pivotally connects to two of the four legs 11 via beam hinges 16, allowing support beams 15 to pivot in a horizontal direction. Although this embodiment uses beam hinges 16 to connect support beams 15 to vertical legs 16, any configuration pivotally connecting support beams 15 to vertical legs 16 may be used.

Figure 2:
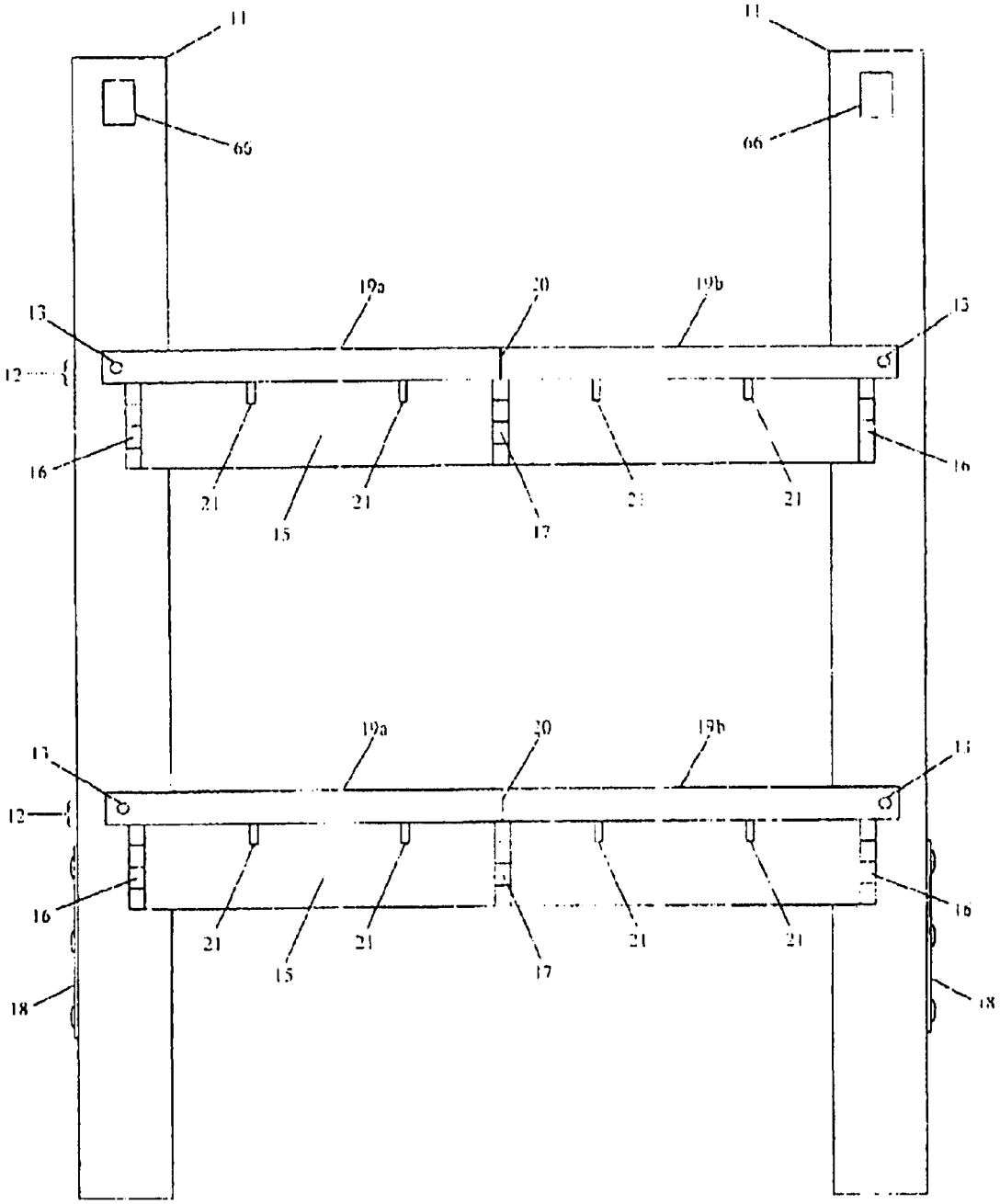
FIG. 2 is a cross-sectional side view of the folding frame as shown in FIG. 1.

Referring now to FIG. 2, a cross-sectional side view of the folding frame as shown in FIG. 1 is illustrated. Each support beam has a center hinge 17 capable of pivoting in a horizontal direction. The combination of beam hinges 16 and center hinge 17 allow for each support beam to fold horizontally inward. Although this embodiment uses a center hinge 17 to allow for the movement of each support beam 15, any configuration allowing the horizontal inward folding of support beam 15 may be used.

Figure 3:
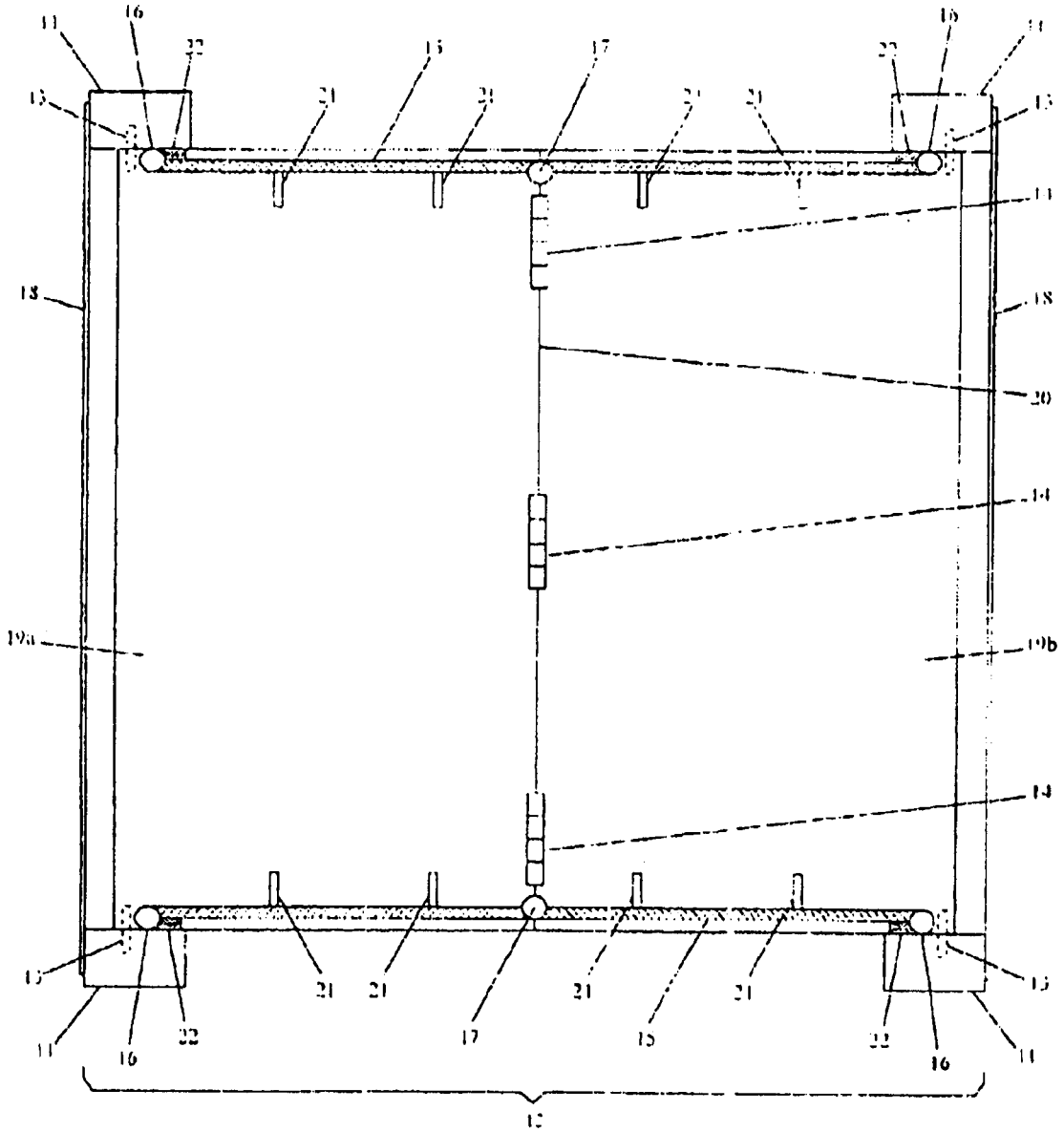
FIG. 3 is a bottom view of one of the shelves of the folding frame as shown in FIG. 1.

Referring now to FIG. 3, a bottom view of one of the shelves of the folding frame as shown in FIG. 1 is illustrated. Shelf 12 includes panels 19a, 19b joined at dividing line 20. Each of the panels 19a, 19b form roughly one half of shelf 12. Panels 19a, 19b are joined by one or more shelf hinges 14 to allow for the vertical upward folding of shelf 12 along dividing line 20. In this embodiment, three shelf hinges 14 are used. Although this embodiment uses panels 19a, 19b and shelf hinges 14 to allow shelves 12 to fold vertically upward, any configuration allowing for the vertical upward folding of shelves 12 may be used.

Still referring to FIG. 3, beam hinges 16 may include mounting devices 22 for affixing the ends of support beams 15 to vertical legs 11. Mounting devices 22 are typically short in length so as not to be visible from the side of folding frame 10.

Still referring to FIG. 3, shelf 12 may have position-limiting devices 21 that prevent support beams 15 from folding horizontally inward while folding frame 10 is in extended position, thus keeping support beams 15 rigid when folding frame 10 is in the extended position. Cross plates 18 may be used to reinforce the stability of folding frame 10 while in the extended position.

Figure 4:
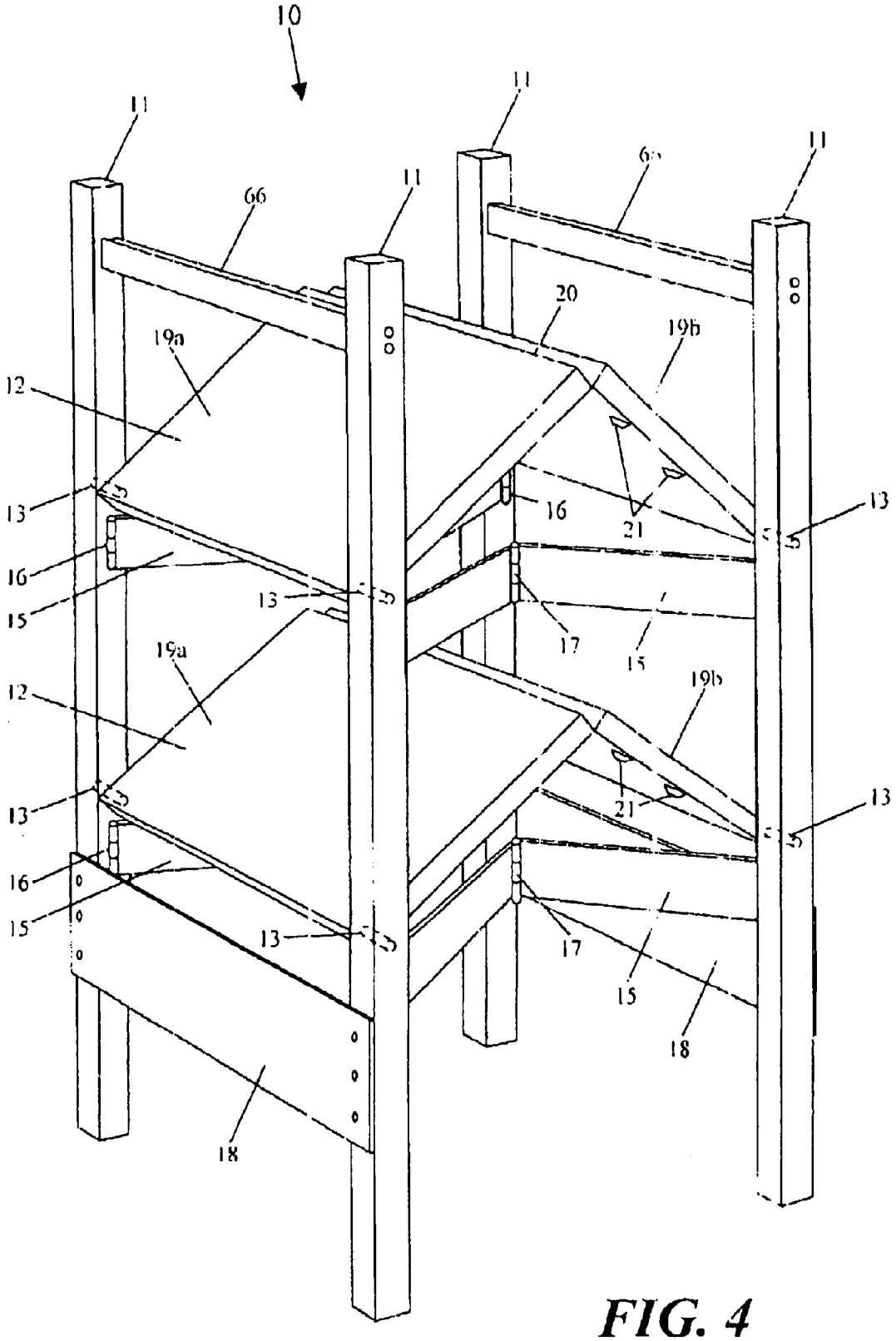
FIG. 4 is a perspective view of the folding frame of the present invention in between the extended and collapsed positions.

Referring now to FIG. 4, a perspective view of the folding frame of the present invention in between the extended and collapsed positions is shown. As shelves 12 fold vertically upward along dividing line 20, support beams 15 fold horizontally inward, and vertical legs 11 are drawn closer together. The combination of shelf hinges 14 (shown in FIG. 3) and shelf studs 13 allow for the vertical folding movement of shelves 12. The combination of beam hinges 16 and center hinge 17 allow for the horizontal folding movement of support beams 15.

Figure 5:
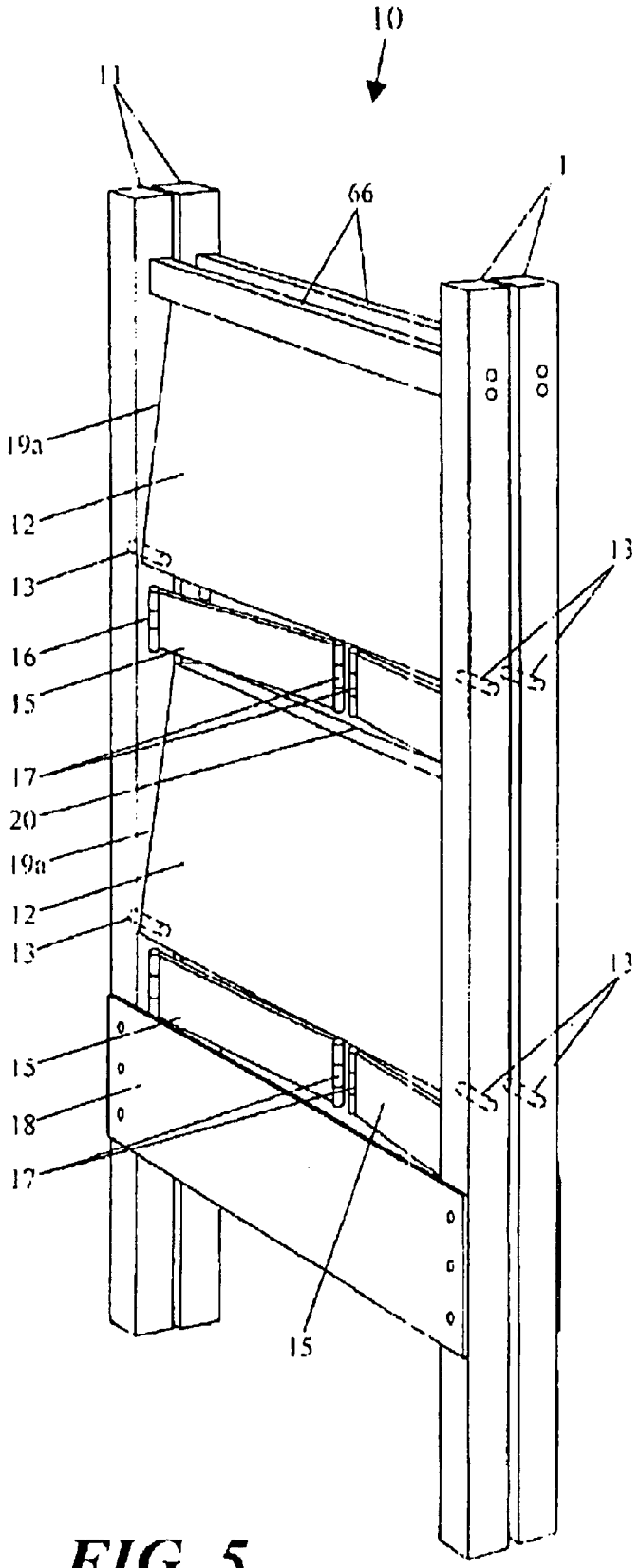
FIG. 5 is a perspective view of the folding frame of the present invention in the collapsed position.

Referring now to FIG. 5, a perspective view of the folding frame of the present invention in the collapsed position is shown. When folding frame 10 is in the collapsed position, shelves 12 are folded along dividing line 20 in a substantially vertical position. Support beams 15, on the other hand, are folded along center hinges 17 in a substantially horizontal manner. Vertical legs 11 connecting the ends of support beams 15 via beam hinges 16 are substantially adjacent to one another.

Still referring to FIG. 5, folding frame 12 must be sized so shelves 12 do not obstruct the folding of folding frame 12. Shelves 12 may be long along dividing line 20 because the length of shelves 12 will not obstruct the vertical upward movement of shelves 12. Shelves 12 cannot be too wide, however, because shelf width may obstruct the vertical upward movement of shelves 12 when folding frame 10 transitions from the extended position to the collapsed position. By properly setting the width of shelves 12, folding frame 10 may be less than 6 inches thick in the collapsed position, thus facilitating transport and storage of folding frame 10.

Figure 6:
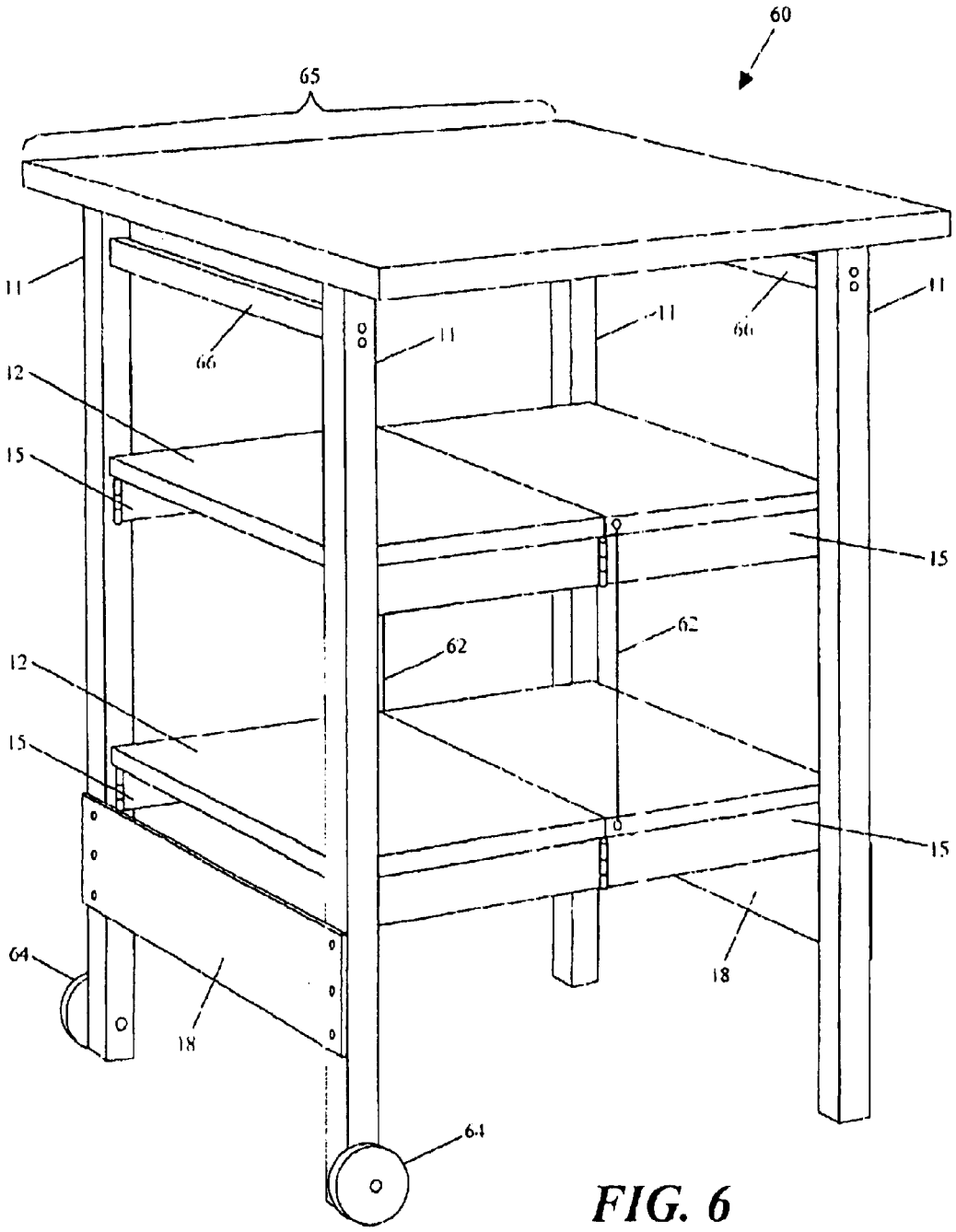
FIG. 6 is an alternative embodiment of a folding frame of the present invention in the extended position.
Figure 7:
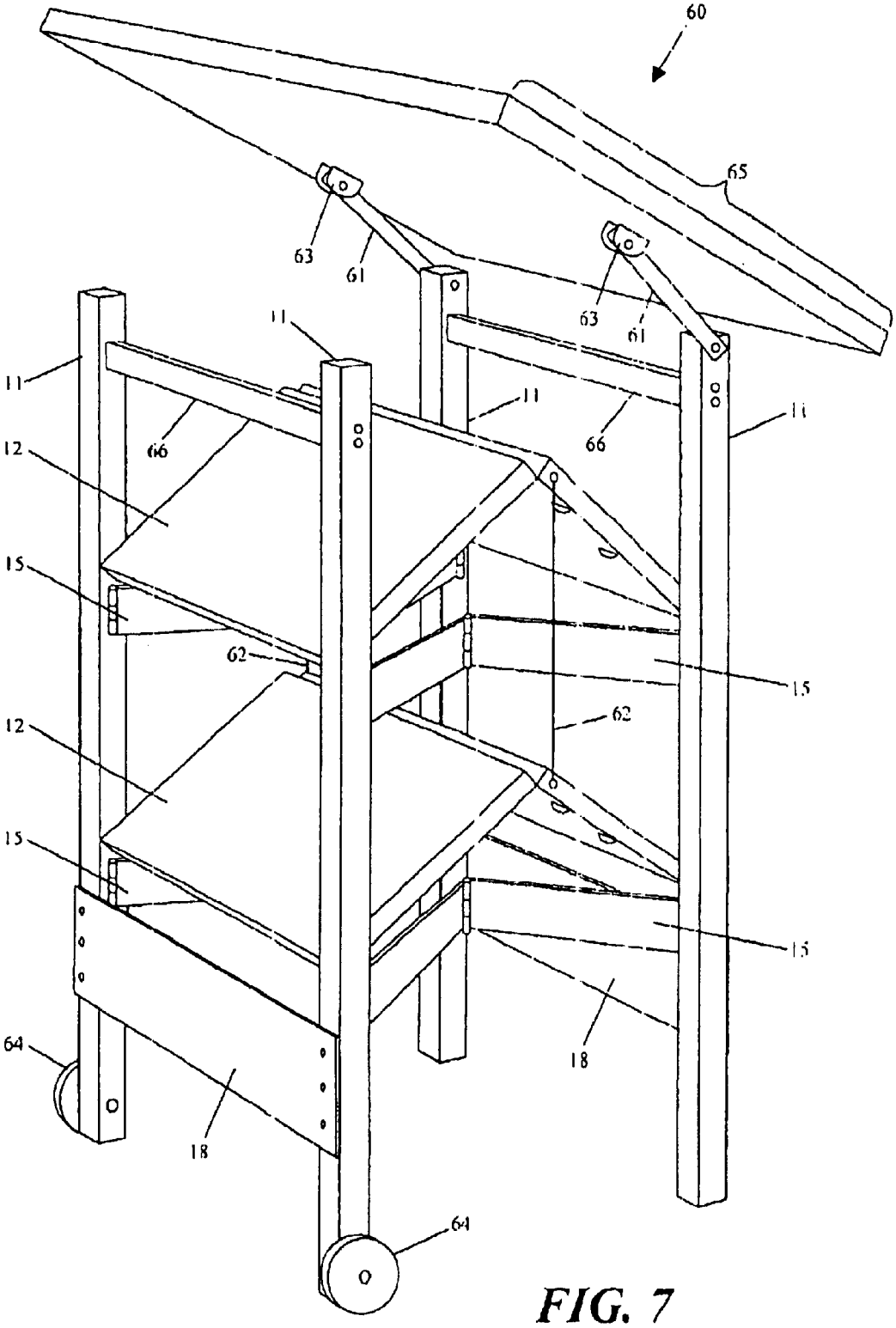
FIG. 7 is an alternative embodiment of a folding frame of the present invention in between the extended and collapsed positions.
Figure 8:
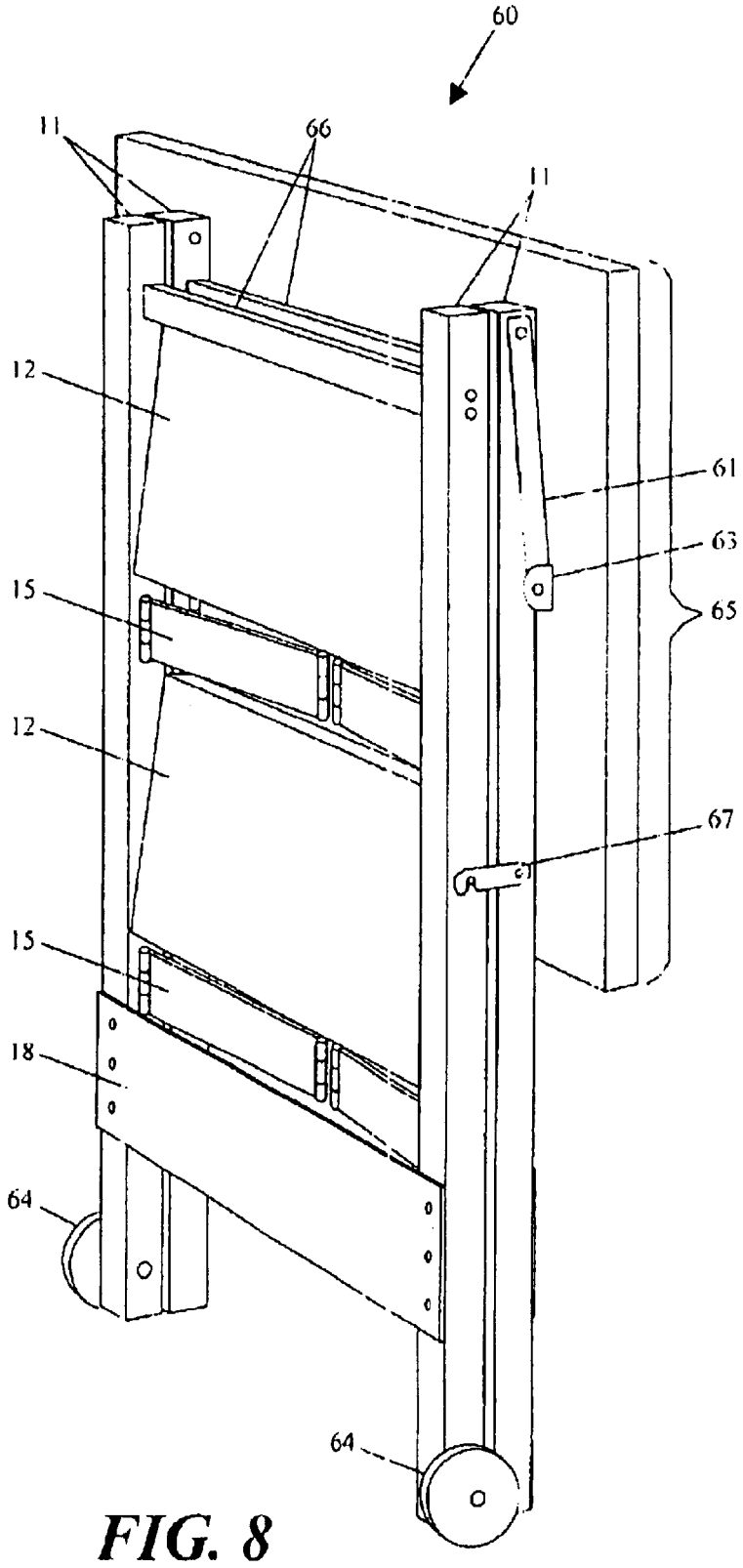
FIG. 8 is an alternative embodiment of a folding frame of the present invention in the collapsed position.

Referring now to FIGS. 6–8, an alternative embodiment of a folding frame 60 of the present invention is shown. To facilitate transport, wheels 64 may be positioned at the bottom end of two or more of the vertical legs 11. In addition, a table surface 65 pivotally attached via pivot arms 61 and pivot hinges 63 to vertical legs 11 and positioned on top of vertical legs 11 may be used. Table surface 65 can be placed in a horizontal position by resting on top of legs 11. Table surface 65 can fold into a vertical position for ease of storage and *transport.*

Still referring to FIGS. 6–8, a cable 62 connecting each of the shelves 12 together may be used to assist in the extending and collapsing of folding frame 60. As one shelf 12 is folded vertically upward, tension in cable 62 causes all shelves 12 to fold vertically upward together. Although this embodiment uses a cable, any other device for connecting all shelves 12 together, such as a rod, may be used. When in the collapsed position, vertical legs 11 may be held together using a locking device 67.

Other embodiments of the invention will appear to those skilled in the art from consideration of the specification and practice of the invention disclosed herein. Possible applications of the folding frame include, but are not limited to, folding kitchen islands, serving carts, workbenches, drafting tables, craft tables, gardening carts, and storage shelves. It is intended that the specification and examples to be considered as exemplary only, with a true scope and spirit of the invention being indicated by the following claims.

What is claimed is:

[1. A folding frame comprising:

four vertical legs;

at least one shelf pivotally connected to each of the four vertical legs, each shelf being capable of folding vertically upward;

two support beams positioned beneath and on opposite ends of each shelf, each support beam being pivotally connected to two of the four vertical legs and capable of folding horizontally inward; and wherein the folding frame is moveable between an extended position with each shelf being horizontal and supported by two of the support beams, and a collapsed position with each shelf being folded vertically upward and the support beams being folded horizontally inward.]

[2. The folding frame according to claim 1 wherein if there is more than one shelf, further comprising a connecting device coupled to the shelves for folding the shelves together.]

[3. The folding frame according to claim 1 further comprising at least one cross plate and one cross beam mounted to the folding frame.]

[4. The folding frame according to claim 1 further comprising at least one position-limiting device to keep the support beams rigid when the folding frame is in the extended position.]

[5. The folding frame according to claim 1 wherein each shelf is pivotally connected to each of the four vertical legs via studs.]

[6. The folding frame according to claim 1 wherein each shelf has two panels connected by at least one hinge, each hinge enabling the shelf to fold vertically upward.]

[7. The folding frame according to claim 1 wherein each support beam is pivotally connected to two of the four vertical legs using hinges.]

[8. The folding frame according to claim 1 wherein each support beam has a center hinge enabling the support beam to fold horizontally inward.]

[9. The folding frame according to claim 1 further comprising a table surface capable of being positioned horizontally on top of the four legs.]

[10. The folding frame according to claim 1 further comprising a wheel attached to at least two of the four vertical legs.]

[11. The folding frame according to claim 1 wherein each shelf is rectangular in shape.]

[12. The folding frame according to claim 1 wherein each shelf is set to a desired width so as not to obstruct the folding frame when transitioning from the extended position to the collapsed position.]

[13. The folding frame according to claim 1 further comprising a locking device to secure the vertical legs together when the folding frame is in the collapsed position.]

[14. A folding frame comprising:

four vertical legs;

at least one rectangular shelf pivotally connected to each of the four vertical legs via studs, each shelf having two panels connected by at least one hinge, each hinge enabling the shelf to fold vertically upward;

two support beams positioned beneath and on opposite ends of each shelf, each support beam being hinged to two of the four vertical legs, each support beam having a center hinge enabling the support beam to fold horizontally inward;

wherein the folding frame is moveable between an extended position with each shelf being horizontal and supported by two of the support beams, and a collapsed position with each shelf being folded vertically upward and the support beams being folded horizontally inward;

at least one cross plate and one cross beam mounted to the folding frame; and at least one position-limiting device to keep the support beams rigid when the folding frame is in the extended position.]

[15. The folding frame according to claim 14 wherein if there is more than one shelf, further comprising a connecting device coupled to the shelves for folding the shelves together.]

[16. The folding frame according to claim 14 further comprising a table surface capable of being positioned horizontally on top of the four legs.]

[17. The folding frame according to claim 14 further comprising a wheel attached to at least to two of the four vertical legs.]

[18. The folding frame according to claim 14 wherein each shelf is set to a desired width so as not to obstruct the folding frame when transitioning from the extended position to the collapsed position.]

[19. The folding frame according to claim 14 further comprising a locking device to secure the vertical legs together when the folding fame is in the collapsed position.]

*20. A folding frame comprising:*

*first, second, third and fourth vertical legs;*

*at least two shelves, with each shelf pivotally connected to each of the four vertical legs, and each shelf being capable of folding vertically upward;*

*two support beams positioned beneath and on opposite ends of each shelf, each support beam being pivotally connected to two of the four vertical legs and capable of folding horizontally;*

*first and second pivot arms each having first and second ends, with the first end of each pivot arm pivotally connected to the first and second legs, respectively;*

*the second end of each pivot arm pivotally connected to a table surface; and*

*wherein the folding frame is moveable between an extended position with each shelf being horizontal and supported by two of the support beams, and the table surface is supported in a horizontal position on top of the four vertical legs, and a collapsed position with each shelf being folded vertically upward and the support beams being folded horizontally, and the table surface is folded into a vertical position alongside the first and second legs by pivoting the pivot arms in an arc of more than 180 degrees.*

*21. The folding frame of claim 20 with the table surface supported only on the four vertical legs, when the folding frame is in the extended position.*

*22. The folding frame of claim 20 with the table surface supported vertically only by the pivot arms, when the folding frame is in the collapsed position.*

*23. The folding frame of claim 20 further comprising a cable connecting each of the shelves together, to assist in extending and collapsing the folding frame.*

*24. A folding table comprising:*

*first, second, third and fourth legs;*

*a first pivot arm having a first end and a second end, with the first end of the first pivot arm pivotally connected to the first leg;*

*a second pivot arm having a first end and a second end, with the first end of the second pivot arm pivotally connected to the second leg;*

*a table surface pivotally connected to the second end of the first pivot arm via a first pivot hinge, and the table surface pivotally connected to the second end of the second pivot arm at a second pivot hinge;*

*at least two shelves, with each shelf including a first panel connected to a second panel by a hinge, with the first panel pivotally connected to the first and second legs, and with the second panel pivotally connected to the third and fourth legs;*

*first and second support beams positioned beneath and adjacent to opposite ends of each shelf, with the first*

*support beam pivotally connected to the first and fourth legs and with the second support beam connected to third and fourth legs, and with the first and second support beams foldable inwardly towards each other; and*

*the first and second pivot arms moveable through an arc of more than 180 degrees, and the table surface connected only to the first and second pivot arms.*

*25. The folding frame of claim 24 comprising a plurality of shelves pivotally connected to each of the four vertical legs and capable of folding vertically upward, and further comprising a connecting device coupled to each of the shelves for folding the shelves together.*

*26. The folding frame of claim 24 further comprising at least one cross plate and one cross beam mounted to the folding frame.*

*27. The folding frame of claim 24 further comprising at least one position-limiting device to keep the support beams rigid when the folding frame is in the extended position.*

*28. The folding frame of claim 24 wherein each shelf is pivotally connected to each of the four vertical legs via studs.*

*29. The folding frame of claim 24 wherein each shelf has two panels connected by at least one hinge, each hinge enabling the shelf to fold vertically upward.*

*30. The folding frame of claim 24 wherein each support beam is pivotally connected to two of the four vertical legs using hinges.*

*31. The folding frame of claim 24 wherein each support beam has a center hinge enabling the support beam to fold horizontally inward.*

*32. The folding frame of claim 24 wherein each shelf is set to a desired width so as not to obstruct the folding frame when transitioning from the extended position to the collapsed position.*

*33. The folding frame of claim 24 further comprising a locking device to secure the vertical legs together when the folding frame is in the collapsed position.*

*34. The folding frame of claim 24 with the pivot arms moveable about three quarters of a turn about the first and second pivot hinges on the first and second pivot arms.*

*35. The folding frame of claim 24 with the table surface comprising a single slab.*

*36. A folding table comprising:*

*first, second, third and fourth legs;*

*a first pivot arm having a first end and a second end, with the first end of the first pivot arm pivotally connected to the first leg;*

*a second pivot arm having a first end and a second end, with the first end of the second pivot arm pivotally connected to the second leg;*

*a table surface pivotally connected to the second end of the first pivot arm via a first pivot hinge, and the table surface pivotally connected to the second end of the second pivot arm at a second pivot hinge;*

*at least two shelves, with each shelf including a first panel connected to a second panel by a hinge, with the first panel pivotally connected to the first and second legs, and with the second panel pivotally connected to the third and fourth legs; and*

*with the first and second pivot arms movable through more than 180 degrees of rotation, wherein the first and second pivot arms are parallel to the first and second legs, respectively, as the table is moved from a folded to an unfolded position.*

*37. The folding table of claim 36 further comprising first and second support beams positioned beneath and adjacent to opposite ends of each shelf, with the first support beam pivotally connected to the first and fourth legs and with the second support beam connected to third and fourth legs, and with the first and second support beams foldable inwardly towards each other.*

*38. The folding table of claim 36 with the table surface connected only to the first and second pivot arms.*

* * * * *